United States Patent
Goto

(10) Patent No.: US 6,422,727 B2
(45) Date of Patent: *Jul. 23, 2002

(54) VEHICLE LAMP

(75) Inventor: Takayoshi Goto, Shizuoka (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,976

(22) Filed: Apr. 1, 1999

(30) Foreign Application Priority Data

Apr. 2, 1998 (JP) .......................................... 10-089624

(51) Int. Cl.⁷ .............................. F21V 5/00; B60Q 1/56
(52) U.S. Cl. ........................ 362/520; 362/497; 362/509; 362/308; 362/309
(58) Field of Search ................................ 362/497, 509, 362/520, 521, 522, 308, 309, 339, 336

(56) References Cited

U.S. PATENT DOCUMENTS

| | | | | |
|---|---|---|---|---|
| 1,345,073 A | * | 6/1920 | Clark | 362/309 |
| 3,408,491 A | * | 10/1968 | George | 362/520 |
| 4,219,867 A | * | 8/1980 | Zehender | 362/518 |
| 4,722,023 A | * | 1/1988 | Arima et al. | 362/521 |
| 4,855,877 A | * | 8/1989 | Otaka | 362/509 |
| 5,081,564 A | * | 1/1992 | Mizoguchi et al. | 362/521 |
| 5,620,246 A | * | 4/1997 | Uehan | 362/518 |
| 5,688,044 A | * | 11/1997 | Watanabe et al. | 362/520 |
| 5,727,874 A | * | 3/1998 | Yamamoto et al. | 362/305 |

FOREIGN PATENT DOCUMENTS

| | | |
|---|---|---|
| JP | 01-79207 | 5/1989 |
| JP | 01-127311 A | 5/1989 |
| JP | 01-128822 A | 5/1989 |

* cited by examiner

Primary Examiner—Thomas M. Sember
Assistant Examiner—David V. Hobden
(74) Attorney, Agent, or Firm—Sughrue Mion, PLLC

(57) ABSTRACT

A vehicle lamp having a hollow body lens unit constructed by integrally forming a lamp body and a front lens which constitute a lamp chamber, a light source provided in the body lens unit, and a diffusion step such as a cylindrical step having step elements, each of which has constant directivity, the diffusion step being provided on the outer surface of the lens portion of the body lens unit. The step elements of the diffusion step on the outer surface of the lens portion are lined up in a predetermined direction and each have directivity, so that the mud and dust do not easily stick to each step element.

4 Claims, 6 Drawing Sheets

VEHICLE LAMP

BACKGROUND OF THE INVENTION

The present invention relates to a vehicle lamp having a lamp body and a front lens which are integrally formed by blow molding into a lamp chamber as a hollow body lens unit. More particularly, the invention relates to a vehicle lamp whose lens portion in a body lens unit is provided with diffusion steps.

In order to decrease the number of component parts constituting a lamp, there has been known a conventional lamp which is constituted by integrally forming, by blow molding, a lamp body and a front lens. FIG. 13 shows a conventional license plate lamp, as an example, using a hollow body lens unit constructed by integrally forming a lamp body and a front lens by blow molding. More specifically, a bulb fitting hole 4 is provided in the lamp body portion 2 of a body lens unit 1 and a bulb 5 as a light source is fitted into the bulb fitting hole 4. Further, an emboss 3a having satin-like minute irregularities is formed on the outer surface of the lens portion 3 of the body lens unit 1 and the light emitted from the lens portion 3 is scattered so that a license plate 7 is irradiated therewith.

Since the emboss 3a is composed of minute irregularities, however, mud and dust resulting in lowering light distribution are apt to stick to the embossed surface and the problem is that even if it is attempted to sop up the mud and dust with a damp cloth and the like, the mud and dust adhering to the uneven surface are hardly easy to remove.

Although the formation of the emboss 3a on the inside of the lens portion 3 makes it unlikely that mud and dust stick to the embossed surface, forming the emboss 3a on the inside thereof is difficult because in the case of blow molding, the hollow body lens unit 1 is formed to a predetermined shape by supplying compressed air into a parison as a plastic material so as to elongate the plastic material by inflating the parison in such a way as to make the plastic material follow a molding surface.

In the case of a license plate lamp, moreover, the emboss 3a causes emitted light to remain to be only scattered, though a region where a difference in brightness occurs is desired to be minimized over the whole license plate 7. Consequently, though the quantity of plate-illuminating light is smoothed to some extent, a region 7a close to the light source of the license plate 7 is extremely bright, whereas a region 7b becomes dark by degrees as its distance from the light source increases. Thus, there develops a problem of deteriorating the visibility.

SUMMARY OF THE INVENTION

The present inventor has come to make the present invention by reasoning that a diffusion step is capable of positively controlling emission light and forming predetermined light distribution on the assumption that step elements lined up in a predetermined well-regulated direction gives the diffusion step a constant directivity and that mud and dust do not easily stick to the above diffusion step in comparison with the case of an emboss and even though the mud and dust come to stick thereto, the mud and dust can simply be wiped with a damp cloth and the like.

An object of the present invention based on the foregoing problems pertaining to the prior art and the present inventor's reasoning is to provide a vehicle lamp whose lens portion has a diffusion step which is formed by blow molding on the outer surface of the lens portion and makes mud and dust not easily stick to the diffusion step and even though the mud and dust are caused to stick thereto, the mud and dust can simply be wiped with a dam cloth and the like.

In order to accomplish the object above, a vehicle lamp according to the present invention comprises a hollow body lens unit constructed by integrally forming a lamp body and a front lens which constitute a lamp chamber, a light source provided in the body lens unit, and a diffusion step such as a fish-eye step and a cylindrical step having step elements, each of which has constant directivity, the diffusion step being provided on the outer surface of lens portion of said body lens unit.

The diffusion step (the fish-eye step or cylindrical step) provided on the outer surface of the lens portion has the constant directivity as the step elements are lined up in the predetermined direction, and mud and dust are apt to slidably move in the direction of orientating the step, thus making the mud and dust not easily stick to the step elements.

Since mud and dust sticking to the diffusion step are apt to slidably move in the direction of orientating the step, moreover, the mud and dust can be wiped with a damp cloth and the like or washed off with flushing water in the direction of orientating the step.

Since the fish-eye step and the cylindrical step act in such a way as to positively diffuse the emitted light in the predetermined direction, it becomes easy to design light distribution in connection with deciding the quantity of light for illuminating a specific region in front of the lamp, to say nothing of uniformizing the quantity of light to be distributed.

According to another aspect of the present invention, the pitch width of each step element of the diffusion step is set not greater than twice the wall thickness of the lens portion.

If the pitch width of the step element is set greater than twice the wall thickness of the lens portion, not only the outer side in the step-forming area of the lens portion but also the inner side therein would follow the surface configuration of a blow mold at the time of blow molding. Consequently, the underside configuration of each step element is also to follow the front configuration of the step element, which results in lowering the light diffusing action. Therefore, the pitch width of each step element of the diffusion step has been set not greater than twice the wall thickness of the lens portion without making the inner side of the lens portion follow the surface configuration of the blow mold at the time of blow molding and also making the underside configuration of the step element follow the front configuration of the step element in order to make the underside thereof flat, so that the diffusion step performs a proper diffusing action.

According to still another aspect of the invention, the height of each step element of the diffusion step is set not greater than the wall thickness of the lens portion.

If the height of each step element of the diffusion step is set greater than the wall thickness of the lens portion, the step-forming area of the lens portion would expand outward (the inner side of the lens portion would cave in) at the time of blow molding and the strength of the lens portion may greatly be reduced because the branching portion between the step-forming area and a non-step-forming area in the lens portion becomes thin-walled in order to prevent not only the corresponding step-forming area on the inner side of the lens portion from extremely caving in at the time of blow molding but also the strength of the lens portion from weakening.

According to still another aspect of the invention, the vehicle lamp is a license plate lamp and the diffusion step is provided in an area at least directly opposite to the light source in the lens portion.

Although the quantity of light emitted from the lens portion is greatest in the area directly opposite to the light source, the light emitted from the area directly opposite to the light source of the lens portion is diffused by the diffusion step in the predetermined direction, whereby the light reaching the license plate lamp becomes smoothed.

DESCRIPTION OF THE PREFERRED EMBODIMENTS

An embodiment of the present invention will now be described with reference to accompanying drawings.

Figure 1:
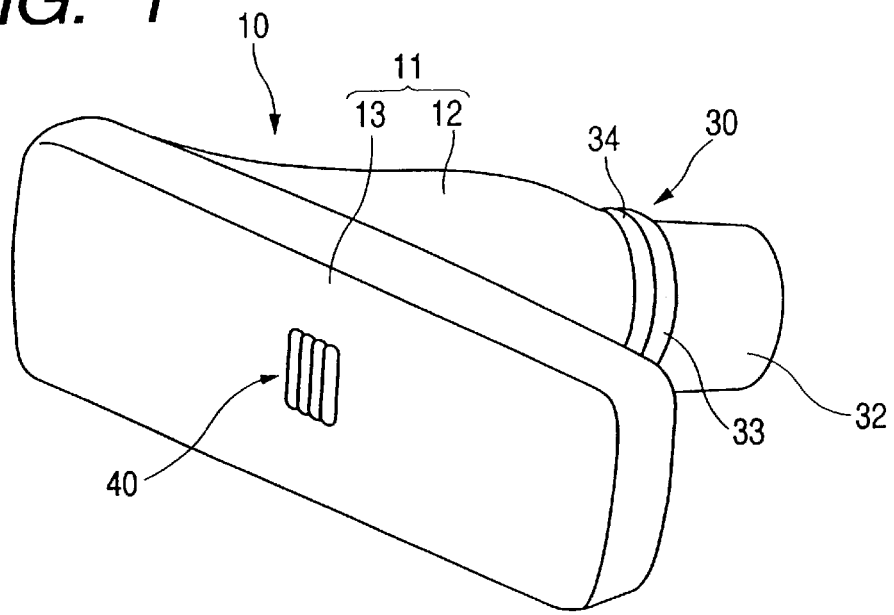
FIG. 1 is a perspective view of an automobile license plate lamp as a first embodiment of the invention.
Figure 2:
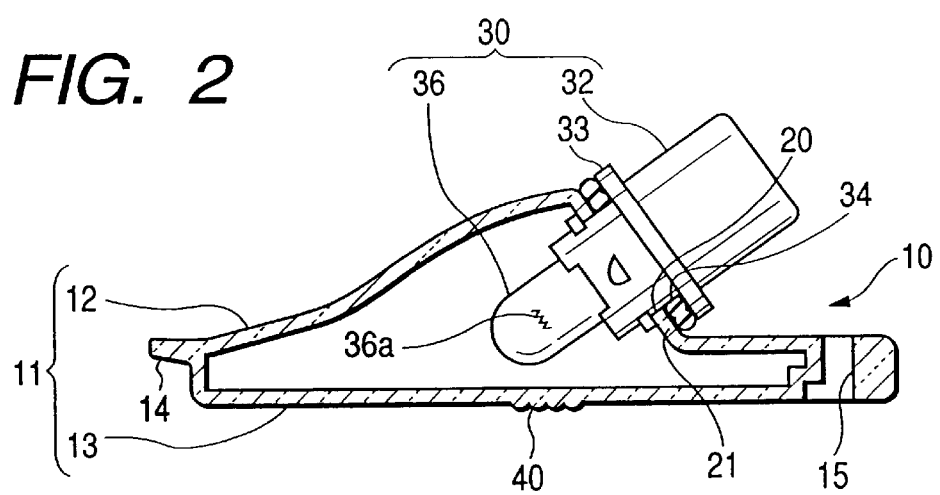
FIG. 2 is a horizontal sectional view of the lamp.
Figure 3:
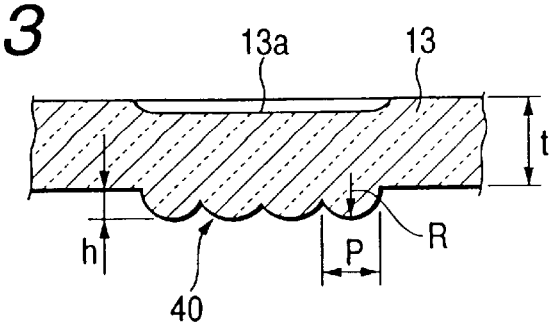
FIG. 3 is an enlarged sectional view of a cylindrical-step forming area in the lens portion.
Figure 4:
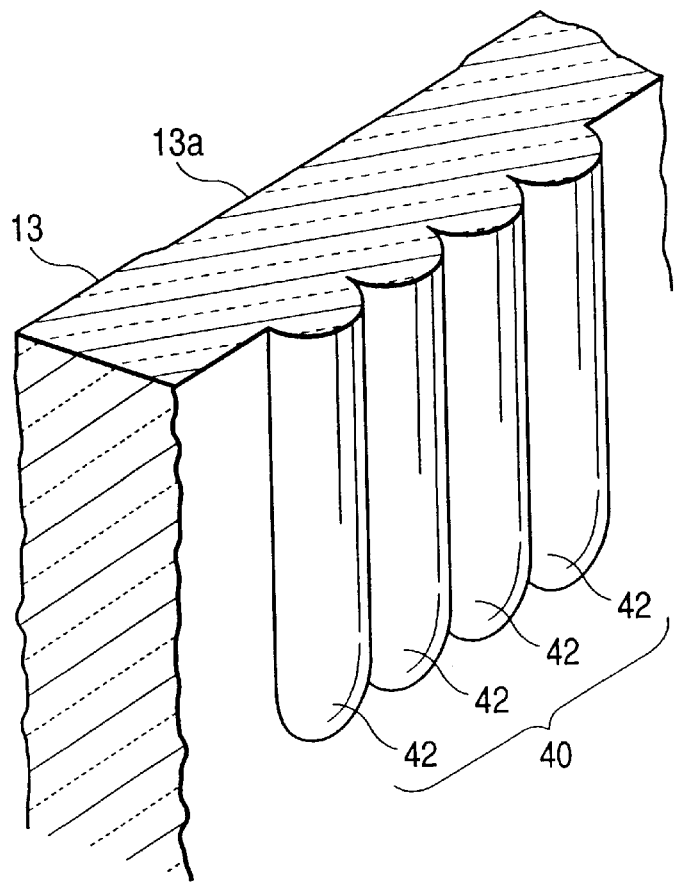
FIG. 4 is an enlarged sectional view of the area.
Figure 5:
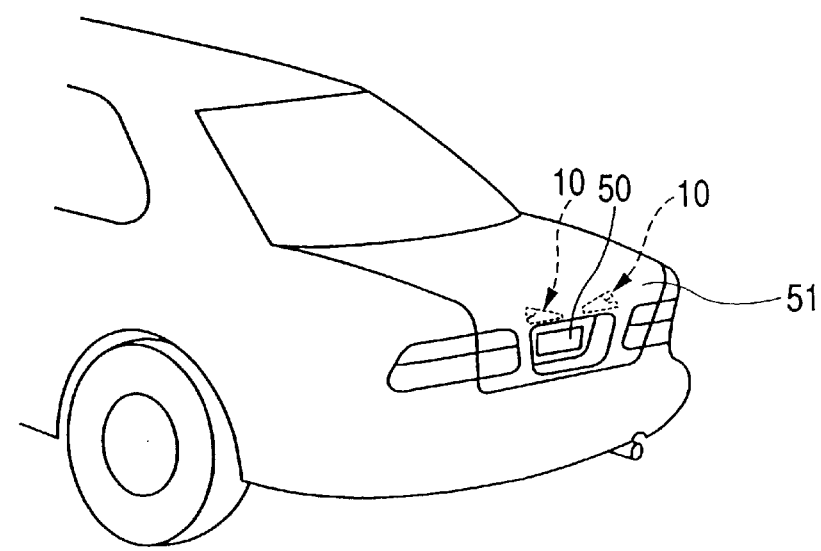
FIG. 5 is a perspective view of the rear portion of an automobile.
Figure 6:
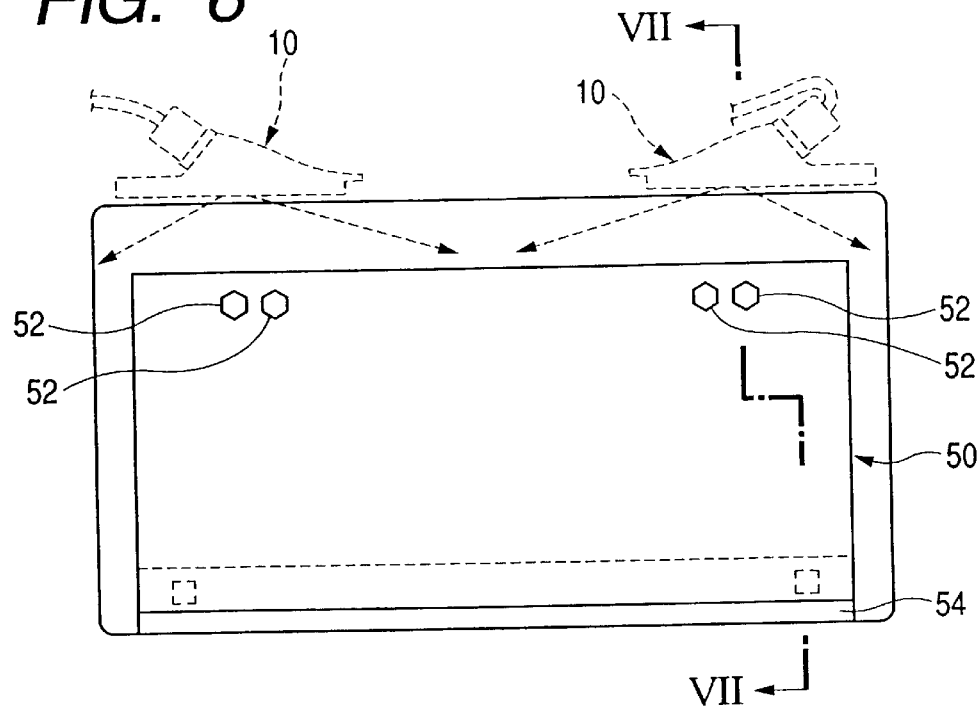
FIG. 6 is an elevational view of the periphery of a license plate in such a state that the lamp has been fitted to a vehicle body.
Figure 7:
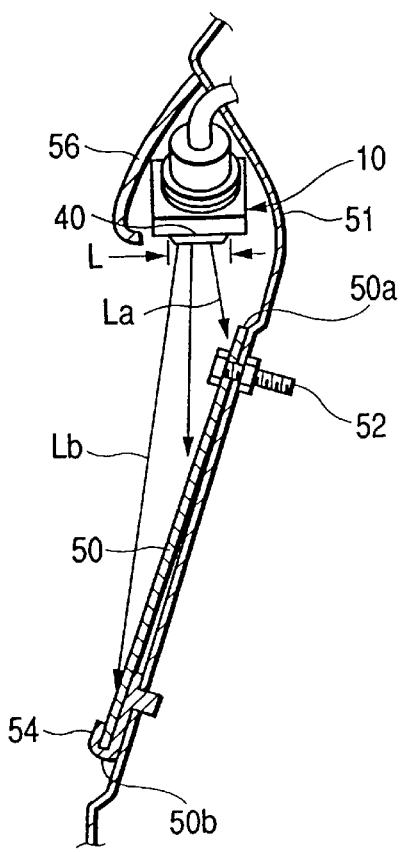
FIG. 7 is a vertical sectional view taken along VII—VII of FIG. 6.
Figure 8:
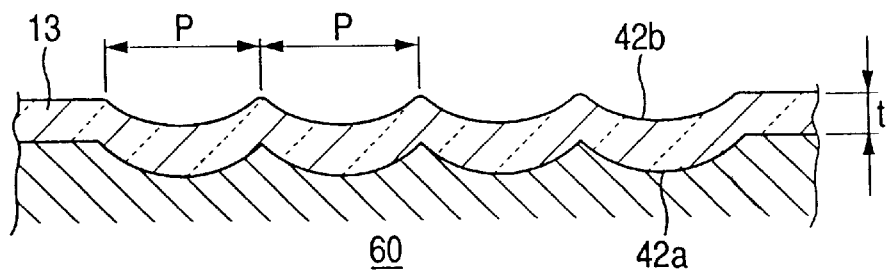
FIG. 8 is a sectional view of an area where a diffusion step is formed in the lens portion when the pitch width of each step element of the diffusion step exceeds twice the wall thickness of the lens portion.
Figure 9:
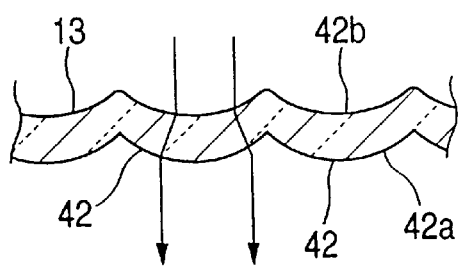
FIG. 9 is a diagram illustrating the lowering of the diffusing action in the area.
Figure 10:
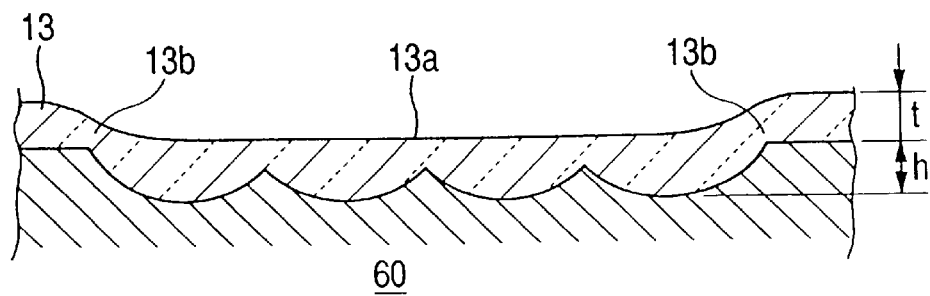
FIG. 10 is a sectional view of the area where the diffusion step is formed in the lens portion when the height of each step element exceeds the wall thickness of the lens portion.

FIGS. 1 through 10 show a first embodiment of the invention, wherein FIG. 1 is a perspective view of an automobile license plate lamp as the first embodiment thereof; FIG. 2, a horizontal sectional view of the lamp; FIG. 3, an enlarged sectional view of an area where a cylindrical step is formed in a lens portion; FIG. 4, an enlarged perspective view of the area; FIG. 5, a perspective view of the rear portion of an automobile; FIG. 6, an elevational view of the periphery of a license plate in such a state that the lamp has been fitted to a vehicle body; FIG. 7, a vertical sectional view taken along VII—VII of FIG. 6; FIG. 8, a sectional view of an area where a diffusion step is formed in the lens portion when the pitch width of each step element of the diffusion step exceeds twice the wall thickness of the lens portion; FIG. 9, a diagram illustrating the lowering of the diffusing action in the area; and FIG. 10, a sectional view of the area where the diffusion step is formed in the lens portion when the height of each step element exceeds the wall thickness of the lens portion.

In these drawings, reference numeral 10 denotes an automobile license plate lamp, which is as shown in FIGS. 5 to 7 provided on both the left and right sides of an upper license plate 50 fixed to the rear end portion of an automobile so as to illuminate the license plate 50 from above.

Reference numeral 52 denotes bolts and nuts for use in fixing the license plate 50 to a vehicle body 51; 54, metal fittings fixed to the vehicle body 51 and used for carrying the license plate 50; and 56, a rear garnish which is fixed to the vehicle body 51 and used to cover the lamp 10.

The lamp body portion 12 and the front lens portion 13 of the license plate lamp 10 are integrally formed by blow molding into a hollow transparent body lens unit 11. A bulb fitting hole 20 is formed by hollowing the flat area of the lamp body portion 12 of the body lens unit 11. A bulb 30 arranged by integrally fitting a wedge base bulb body 36 into a bulb socket 32 is fitted into the bulb fitting hole 20 by bayonet engagement.

Reference numeral 34 denotes a gasket installed in between a flange portion 33 peripherally fitted to a bulb socket 32 and a peripheral edge portion 21 of the bulb fitting hole. The gasket 34 compressed in between the flange portion 33 and the peripheral edge portion 21 of the bulb fitting hole acts as what maintains a state in which the bulb socket 32 has been fitted into the bulb fitting hole 20 and as what seals a gap between the flange portion 33 and the peripheral edge portion 21 of the bulb fitting hole.

A cylindrical step 40 as a diffusion step having vertical directivity is provided in a position directly opposite to the filament 36a of the bulb 30 on the outer surface of the lens portion 13 of the body lens unit 11, and the light emitted forward to the lens portion 13 through the cylindrical step 40 is diffused to the left and right in order to illuminate the license plate 50.

More specifically, the cylindrical step 40 is in such a shape that semicircular arcuate step elements vertically extending are continuously formed to the left and right at equal intervals. The light emitted from the lamp 10 has the largest quantity of light emitted from an area directly opposite to the filament 36a of the bulb 30 in the lens portion 13. However, the smoothed quantity of light is led to the lower license plate 50 because a larger quantity of emitted light is diffused by the license plate 50 to the left and right.

Further, the license plate 50 is as shown in FIG. 6 illuminated with the smoothed quantity of light from the left and right as diffused light is distributed from a pair of lamps 10 and 10 laterally provided. Further, the vertical length L (10 mm) (As shown in FIG. 1) of the cylindrical step 40 (the step element 42) is set at least long enough to make the whole light between rays of light La and Lb emitted from the filament 36a of the bulb 30 and directed to the upper edge portion 50a and the lower edge portion 50b of the license plate 50 (see FIG. 7) diffuse laterally, so that the whole vertical area of the license plate 50 is illuminated with the diffused light.

Reference numeral 14 denotes a bracket integrally formed with the left-side portion of the body lens unit 11 and retained and supported by a lamp retaining portion (not shown) provided for the vehicle body 51; and 15, a clamp-screw fitting hole for a screw for fixing the lamp 10 to the vehicle body 51.

Since the cylindrical step 40 as the diffusion step provided on the outer surface of the lens portion has the constant directivity in that each step element 42 is vertically extended, mud and dust are apt to slidably move in the direction of orientating the step (the vertical direction in which the step element 42 is extended) and hardly easy to remove from the cylindrical step 40 (each of the step elements) to the extent described above.

Even if mud and dust stick to the cylindrical step 40 (each of the step elements 42), the mud and dust may easily be removed by wiping and washing the mud and dust in the direction of orientating the step as the mud and dust are apt to slidably move in the direction of orientating the step (the vertical direction)

The pitch width P (1.0 mm according to this embodiment of the invention) of each step element 42 of the cylindrical step 40 is set not greater than twice the wall thickness t (2.0 mm according to this embodiment of the invention) of the lens portion 13, so that the cylindrical step 40 is formed to a predetermined shape fit for performing a proper diffusing action.

More specifically, if the pitch width P of the step element 42 exceeds twice the wall thickness t of the lens portion, the surface configuration on the inside of the lens portion 13, like the surface configuration on the outside thereof, will follow the surface configuration of a mold 60 at the time of blow molding as shown in FIG. 8, thus making the inner configuration 42b of each step element 42 follow the outer configuration 42a thereof. Therefore, the light emitted from such a step as mentioned above is not diffused practically as shown in FIG. 9, which results in lowering the diffusing action of light.

If the width pitch P of each step element 42 is set not greater than twice the wall thickness t of the lens portion 13 (see FIGS. 3 and 4), on the other hand, the surface configuration on the inside of the lens portion 13 will be flat without following the shape of the step element outside the lens portion 13, though a depression 13a slightly larger than the size equivalent to a step-forming area is formed therein. Consequently, the pitch width P of the step element 42 is set not greater than twice the wall thickness t of the lens portion 13 so that a proper light diffusing action may be demonstrated.

Moreover, the height h (0.6 mm according to this embodiment of the invention) of each step element 42 of the cylindrical step 40 is set not greater than the wall thickness t (2.0 mm according to this embodiment of the invention) of the lens portion 13, so that the lowering of strength due to decreasing the wall thickness of the lens portion 13 accompanied with the formation of the cylindrical step 40 is restrained.

In other words, if the height of the step element 42 exceeds the wall thickness t of the lens portion 13, the underside 13a of the step-forming area of the lens portion 13 largely caves in at the time of blow molding. Moreover, a branching portion 13b between the step-forming area and a non-step-forming area in the lens portion becomes 13 thin-walled, which may result in conspicuously lowering the strength of the lens portion 13.

Therefore, the height h of the step element 42 is set not greater than the wall thickness t of the lens portion 13 in order to prevent the inside of the lens portion 13 from largely caving in. Further, the curvature of the circular arc of the step element 42 is set like R=0.6 mm, whereby the light emitted from each of the steps 40 of the lamps 10 on both lateral sides is uniformly diffused over substantially half the area in the lateral direction of the license plate 50.

Figure 11:
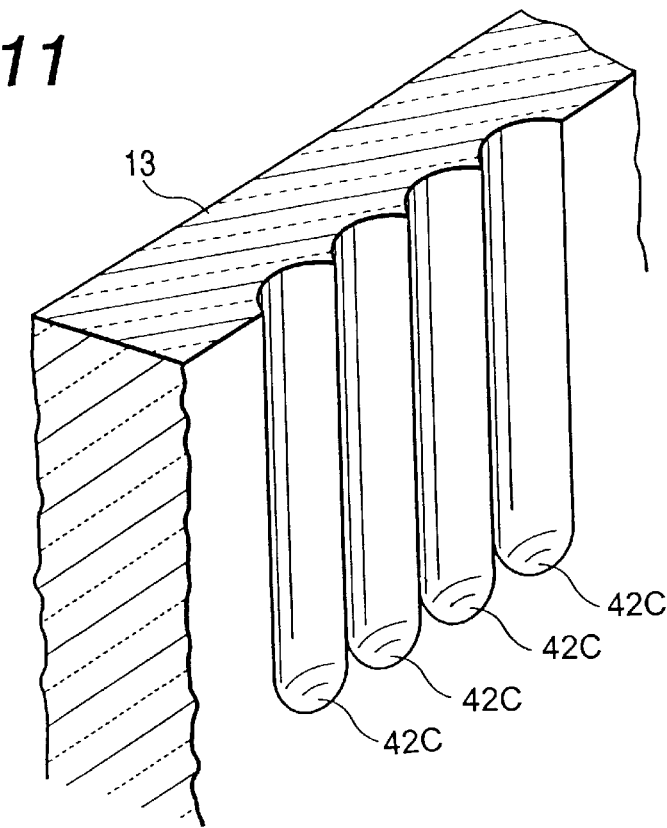
FIG. 11 is a perspective view of a diffusion step as the principal part of an automobile license plate lamp as a second embodiment of the invention.
Figure 12:
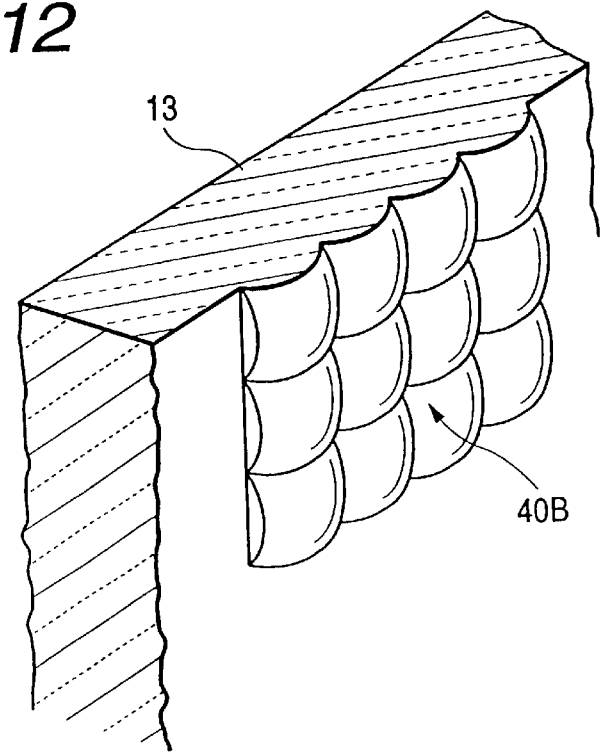
FIG. 12 is a perspective view of a diffusion step as the principal part of an automobile license plate lamp as a third embodiment of the invention.
Figure 13:
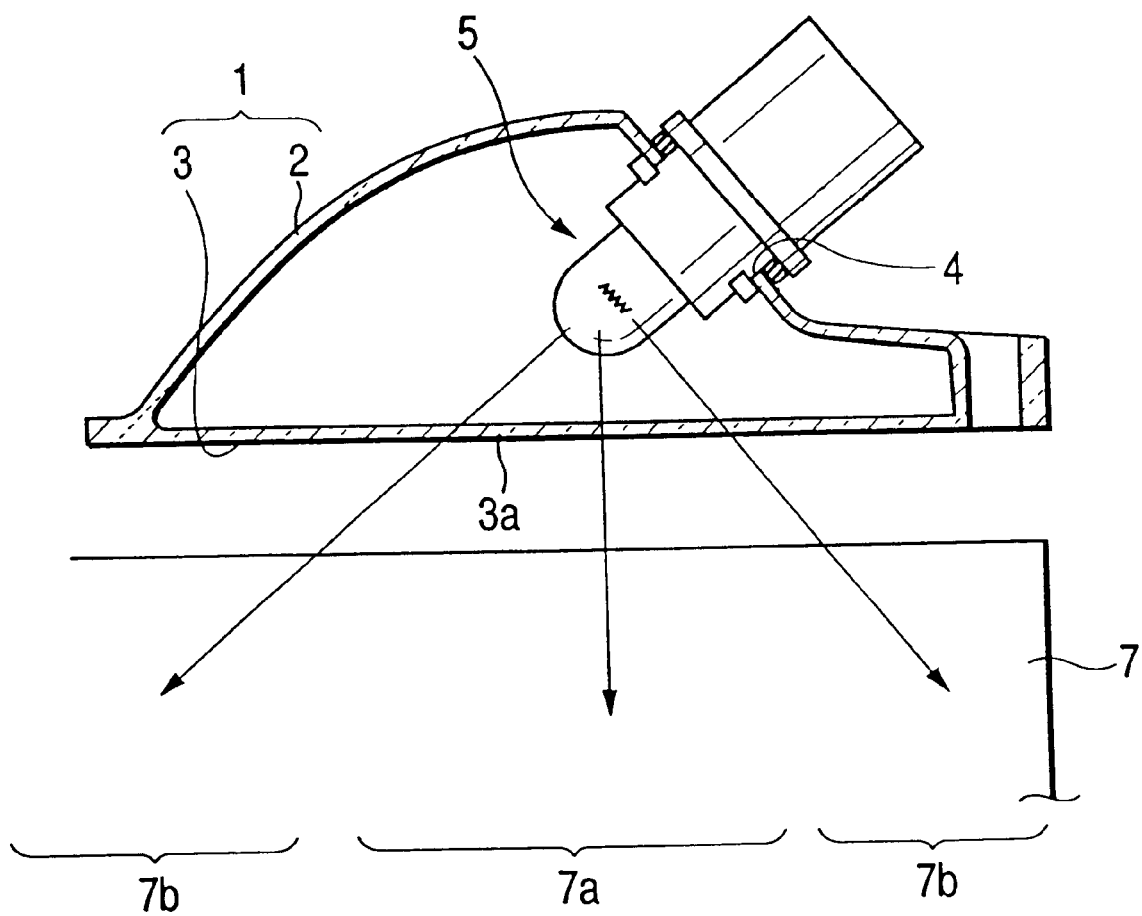
FIG. 13 is a sectional view of the periphery of a bulb fitting hole of a conventional lamp.

Although the diffusion step formed in the lens portion 13 is the cylindrical step 40 projecting forward according to the above embodiment of the invention, use may be made of concave step elements 42A which are laterally continuous and have vertical directivity as shown in FIG. 11 or a fish-eye step 40B having directivity in two vertical-to-horizontal intersecting directions as shown in FIG. 12.

Although an automobile license plate lamp has been described in the aforementioned embodiment of the invention, application of the present invention is not limited to the license plate lamp but the invention may also widely be applicable to beacon lamps and any other vehicle lamps.

As is obvious from the description given above, the diffusion step provided on the outer surface of the lens portion in the vehicle lamp in claim 1 has constant directivity and this makes mud and dust hardly stick to the diffusion step. Besides there is no fear that light distribution is lowered because mud and dust sticking to the diffusion step can simply be wiped with a damp cloth and the like or washed off with flushing water.

Unlike an emboss, the fish-eye step and the cylindrical step are such that not only a diffusion angle but also the direction of diffusion is readily controlled, whereby it becomes easy to design light distribution for the front lens (lamp).

The inner side of the lens portion is formed flat by setting the pitch width of each step element not greater than twice the wall thickness of the lens portion and since the step elements corresponding to the molding surface is formed outside the lens portion, the proper diffusing action of the diffusion step allows predetermined light distribution to be secured.

Further, there is no fear that the strength of the lens portion is lowered because the step-forming area inside the lens portion substantially caves in, thus ensuring the durability of the lamp. Moreover, as the diffusion step never protrudes particularly from the front of the lens portion, mud and dust are unlikely to stick to and dust the diffusion step in particular.

In addition, visibility of the license plate is improved since the light emitted from the area directly opposite to the light source having the largest quantity of light is diffused by the diffusion step so as to uniformly illuminate the whole license plate.

What is claimed is:

1. A vehicle lamp comprising:
   a hollow body lens unit integrally formed with a lamp body and a front lens, said front lens having inner and outer surfaces wherein said inner surface is flat;
   a light source provided in said body lens unit;
   a diffusion step portion having step elements disposed on an outer surface of said front lens of said body lens unit, said step elements being arranged in constant directivity;
   a non-diffusing portion disposed on said front lens of said body lens unit and adjacent to said diffusion step portion,
   wherein a pitch width of each step element of said diffusion step portion is less than or equal to twice a wall thickness of said front lens.

2. A vehicle lamp in accordance with claim 1, wherein each of said step elements has a common pitch width.

3. The vehicle lamp as claimed in claim 1, wherein a height of each step element of said diffusion step portion is less than or equal to the wall thickness of said front lens.

4. A vehicle lamp in accordance with claim 1, wherein each of said step elements has a rectangular base connected to the outer surface of the front lens and protrudes away from the front lens to form a fish-eye pattern.

* * * * *